Sept. 11, 1962  A. M. STOTT  3,053,131
EXPLOSIVELY RELEASED BOLT
Filed April 28, 1960
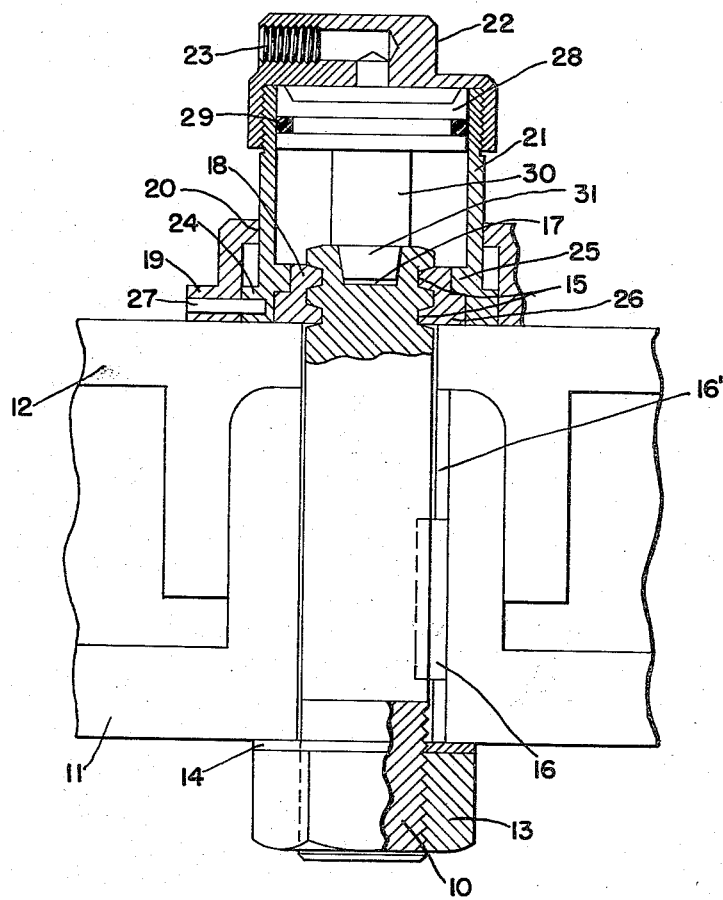
INVENTOR.
ALBERT M. STOTT

3,053,131
EXPLOSIVELY RELEASED BOLT
Albert M. Stott, Clifton Heights, Pa., assignor to the United States of America as represented by the Secretary of the Army
Filed Apr. 28, 1960, Ser. No. 25,492
2 Claims. (Cl. 85—7)
(Granted under Title 35, U.S. Code (1952), sec. 266)

The invention described herein may be manufactured and used by or for the Government for governmental purposes without the payment to me of any royalty thereon.

This invention relates to disconnect devices, and has for its principal object to provide an improved device which is operable by a gas pressure to disconnect or unlock one part of an apparatus from another. It is hereinafter described as utilized to disconnect a nose or capsule from the remainder of a disabled aircraft. As will be apparent to those skilled in the art it is equally applicable to other situations where it is required to separate parts of an apparatus or structure positively and with a minimum of delay.

There are presently available various types of explosive bolts. Such bolts generally have the disadvantage that they are complicated by the location of the explosive charge in or near the bolt and may on occasion be ruptured in an untimed relationship with other desired effects. The present invention avoids these difficulties by the provision of a disconnect device which is operated by a gas pressure to disconnect and eject the bolt from the parts normally bound together by it.

The invention will be better understood from the following description when considered in connection with the accompanying drawings and its scope is indicated by the appended claims.

The single FIGURE of the drawing shows a bolt 10 which extends through a member 11 which is fixed to an aircraft and a member 12 which is part of a nose or capsule. The capsule encloses the pilot and is rocketed away from the craft immediately following its disconnection therefrom. While only one bolt is shown, it is to be understood that the two members 11 and 12 may be joined together by a plurality of bolts which are required to be disconnected simultaneously.

The bolt 10 has threaded onto one end a nut 13 which bears against a washer 14. It has at the other end a pair of circumferential grooves 15 which have divergent sides. It is held against rotation by a key 16 and has an end recess 17. Key 16 is received in a keyway 16' in the member 11.

A split nut 18 has interior surfaces converging to fit into the grooves 15 and has a stepped exterior surface.

A bracket 19 has an interior flange 20. A cylinder 21 has at one end an end cap 22 with an inlet 23 therethrough and at the other end an exterior flange 24 which is alined with the flange 20. Intermediate the ends of the cylinder 21 is a stepped surface 25 which is alined with stepped surface 26 of the split nut 18. A shear pin 27 fixes the bracket 19 to the cylinder 21 with the stepped surfaces 25 and 26 against one another and with the flanges 20 and 24 spaced apart.

A piston 28, encircled by a seal ring 29, is movable in the cylinder 21 by a gas pressure between it and the end cap 22. This piston has a rod 30 which extends into the recessed end of the bolt 10. The reduced end 31 of the piston rod functions to prevent cocking of the piston. The stepped surfaces of the split nut and cylinder have the advantage that they result in a shorter piston stroke.

Operation of the disconnect device is initiated by the application of a gas pressure between piston 28 and the end cap 22. This pressure exerts equal and opposite forces on the end cap and piston. The force acting on the end cap shears the pin 27 and moves the cylinder 21 in manner to separate the stepped surfaces 25 and 26 and free the nut 18. The force applied to the piston then forcibly spreads the split nut this being facilitated by the angular surfaces of the grooves 15. Following the spreading of the split nut, the bolt 10 is ejected through the nut and the parts 11 and 12 are disconnected from one another.

The multi-groove arrangement on the bolt 10 is desirable where the load on the bolt would produce heavy compressive bearing stresses in a single groove. It is important that the split nut 18 be sufficiently long to avoid tipping and distortion of the cylinder 21.

I claim:
1. In a disconnect device the combination of a bolt having near one end a circumferential groove with divergent sides, a radially split nut having interior surfaces converging to fit into said groove and having a stepped exterior surface formed by a first cylindrical part and a second cylindrical part of greater diameter than said first part, an interiorly cylindrical bracket having an interior flange on one end thereof that extends radially inward a greater distance than the adjacent cylindrical portion thereof, a cylinder having at one end an end cap with an opening therethrough and at the other end an exterior flange of greater diameter than the body portion of the cylinder and of a diameter sufficient to abut the interior flange of the bracket, said cylinder having interiorly thereof and intermediate its ends a stepped surface formed by a portion that extends radially inward a greater distance than said second cylindrical part of the split nut, a shear pin fixing said bracket to said cylinder with said nut and cylindrical stepped surfaces engaged and with the interior flange of the bracket and the exterior flange of the cylinder spaced apart, and a piston movable in said cylinder by a gas pressure to apply to said cylinder a force whereby said pin is sheared and said cylinder is moved to release said nut and to apply to said bolt a force whereby said bolt is ejected from said nut, and the nut segments are retained in the space left empty by the cylinder as the cylinder moves vertically to cause the exterior flange thereof to move into abutting engagement with the interior flange of said bracket.

2. A device according to claim 1 wherein the end of said bolt has a recess into which the rod of said piston extends for preventing the cocking of said piston.

References Cited in the file of this patent
UNITED STATES PATENTS
2,421,807   Rickey et al. _____ June 10, 1947
2,949,822   Musser _____ Aug. 23, 1960